United States Patent
McCormick et al.

(10) Patent No.: US 6,199,844 B1
(45) Date of Patent: Mar. 13, 2001

(54) STRIKER CAP FOR VEHICLE SUSPENSION SYSTEM

(75) Inventors: Paul B. McCormick, Royal Oak; Mark C. Smith; Richard R. Churay, both of Troy, all of MI (US)

(73) Assignee: Chrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/123,042

(22) Filed: Jul. 27, 1998

(51) Int. Cl.[7] ................................... B60G 13/00
(52) U.S. Cl. .................. 267/221; 267/140; 267/153; 267/33
(58) Field of Search ................ 267/221, 33, 34, 267/140, 152, 153; 280/124.145, 124.146, 124.147, 124.148

(56) References Cited

U.S. PATENT DOCUMENTS

| | | | |
|---|---|---|---|
| 3,831,923 | * 8/1974 | Meldrum | 267/140 |
| 4,256,292 | * 3/1981 | Sullivan, Jr. et al. | 267/33 |
| 4,298,193 | 11/1981 | Mourray | 267/63 |
| 4,434,977 | 3/1984 | Chiba et al. | 267/33 |
| 4,555,096 | 11/1985 | Pryor | 267/8 |
| 4,568,067 | 2/1986 | Iwata | 267/8 |
| 4,712,776 | 12/1987 | Geno et al. | 267/64.21 |
| 4,721,325 | 1/1988 | Mackovjak et al. | 280/668 |
| 4,771,994 | 9/1988 | Makita | 267/64 |
| 4,771,996 | 9/1988 | Martinez, Jr. et al. | 267/220 |
| 4,810,003 | 3/1989 | Pinch et al. | 280/668 |
| 4,969,542 | 11/1990 | Athmer et al. | 188/322.12 |
| 5,009,401 | 4/1991 | Weitzenhof | 267/64.21 |
| 5,133,573 | 7/1992 | Kijima et al. | 280/697 |
| 5,211,380 | 5/1993 | Germano | 267/221 |
| 5,263,694 | 11/1993 | Smith et al. | 267/220 |
| 5,308,104 | 5/1994 | Charles | 280/668 |
| 5,362,035 | 11/1994 | Carter | 267/220 |
| 5,467,970 | 11/1995 | Ratu et al. | 267/220 |

FOREIGN PATENT DOCUMENTS

| | | |
|---|---|---|
| 3538150 | 4/1987 | (DE) . |
| 2172960 | 10/1986 | (GB) . |

* cited by examiner

Primary Examiner—Robert J. Oberleitner
Assistant Examiner—Devon Kramer
(74) Attorney, Agent, or Firm—Lawrence J. Shurupoff

(57) ABSTRACT

Contact noise generated between a striker cap mounted on a strut and a jounce bumper connected to a shock tower is reduced by providing an axial projection on the roof of the striker cap. The projection progressively displaces and compresses the elastomeric jounce bumper material and thereby avoids large compressive impulse forces and associated noise generation.

7 Claims, 3 Drawing Sheets

STRIKER CAP FOR VEHICLE SUSPENSION SYSTEM

BACKGROUND OF THE INVENTION

1. Field of the Invention

The present invention relates in general to a jounce bumper and coacting striker cap for absorbing shock forces between a vehicle body and a vehicle suspension system and in particular to a striker cap bumper which fits over the end of a strut and is shaped to reduce impact noise.

2. Description of Prior Developments

A rubber or elastomeric jounce bumper is typically mounted between a vehicle body (or strut mount attached to the body) and a shock absorbing member such as a suspension strut to prevent metal-to-metal contact during severe jounce travel. A cover or striker cap may be provided between the end of the strut and the jounce bumper to protect the end of the strut and the strut seal from damage during such extreme jounce movements.

Although prior jounce bumper and striker cap assemblies have performed satisfactorily, they tend to produce a relatively large noise upon mutual engagement and impact during jounce movements. In some cases, where the jounce bumper is mounted relatively close to an occupant of the vehicle, the impact noise can become so loud as to be annoying and generally unacceptable.

Accordingly, a need exists for a jounce bumper and striker cap assembly which operates quietly and effectively.

SUMMARY OF THE INVENTION

The present invention has been developed to fulfill the needs noted above and, therefore, has as an object the provision of a striker cap and jounce bumper assembly that operates quietly and effectively without adding significant cost to the assembly or substantially changing the design. The invention is focused on a specially contoured striker cap which includes an axial projection of limited surface area which makes first contact with the jounce bumper. The cross-section of the projection preferably decreases in the axial direction toward the jounce bumper so that a gradual and progressive contact and displacement area develops between the striker cap and jounce bumper during severe jounce movement.

BRIEF DESCRIPTION OF THE DRAWINGS

In the drawings.

In the drawings, like reference numerals denote like or similar parts.

DETAILED DESCRIPTION OF THE PREFERRED EMBODIMENTS

Figure 1:
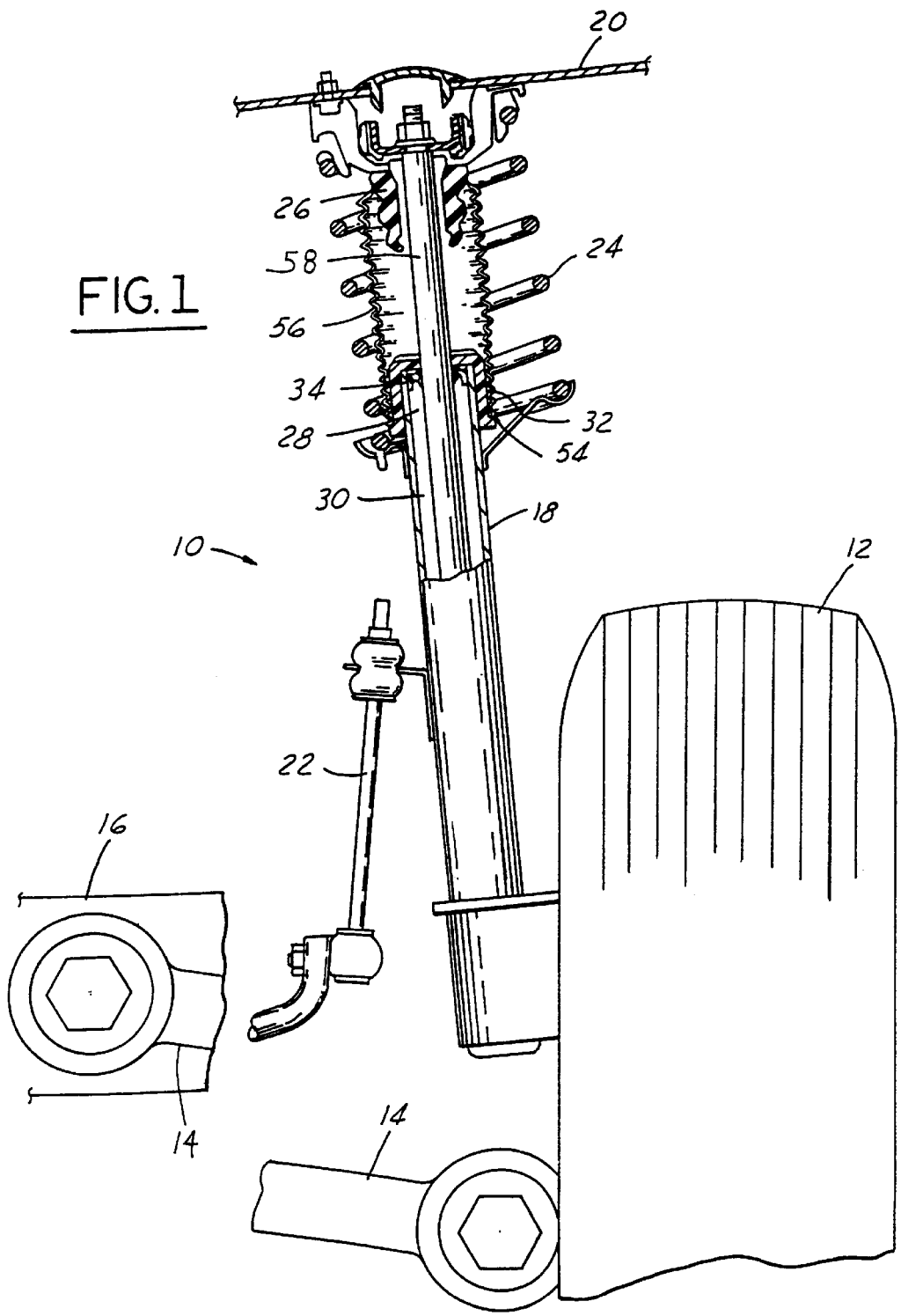
FIG. 1 is a schematic view, partly in section, of a vehicle suspension system provided with a striker cap constructed in accordance with the invention.

The present invention will now be described in conjunction with the drawings, beginning with FIG. 1 which shows a vehicle suspension system 10 of the type used to mount a rear tire 12 to a vehicle. A pivoting lateral link 14 interconnects the tire wheel to a cross bar 16 which forms a portion of a vehicle frame or chassis. A strut 18 interconnects the tire wheel to a shock tower 20 formed on the body of a vehicle.

A stabilizer bar 22 extends between the vehicle chassis and the strut 18 to further support the strut and rear tire. A coil spring 24 is mounted between the shock tower 20 and strut 18 to absorb shocks transmitted between the tire 12 and vehicle body. A jounce bumper 26 is mounted between the shock tower 20 and the top end 28 of the strut cylinder 30.

Figure 3:
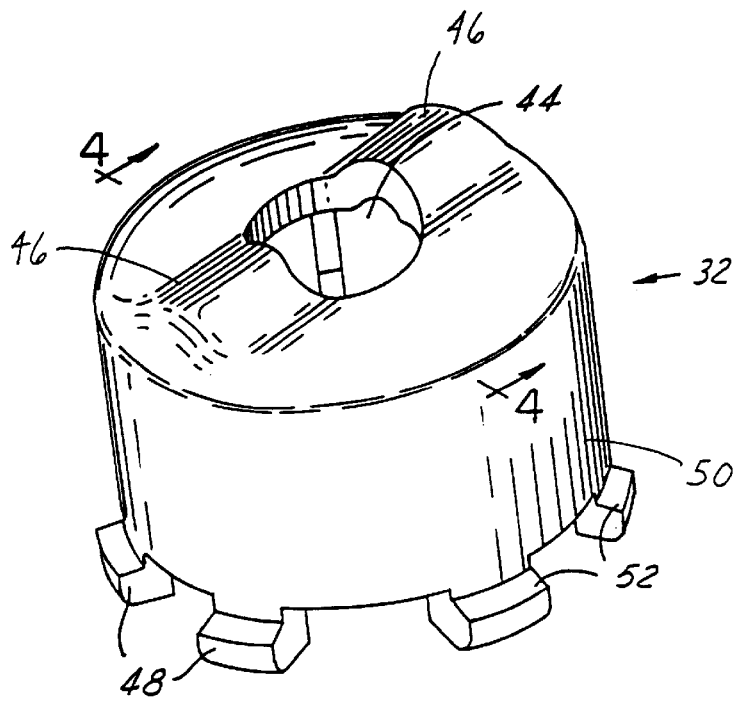
FIG. 3 is a top perspective view of the striker cap of FIGS. 1 and 2.
Figure 4:
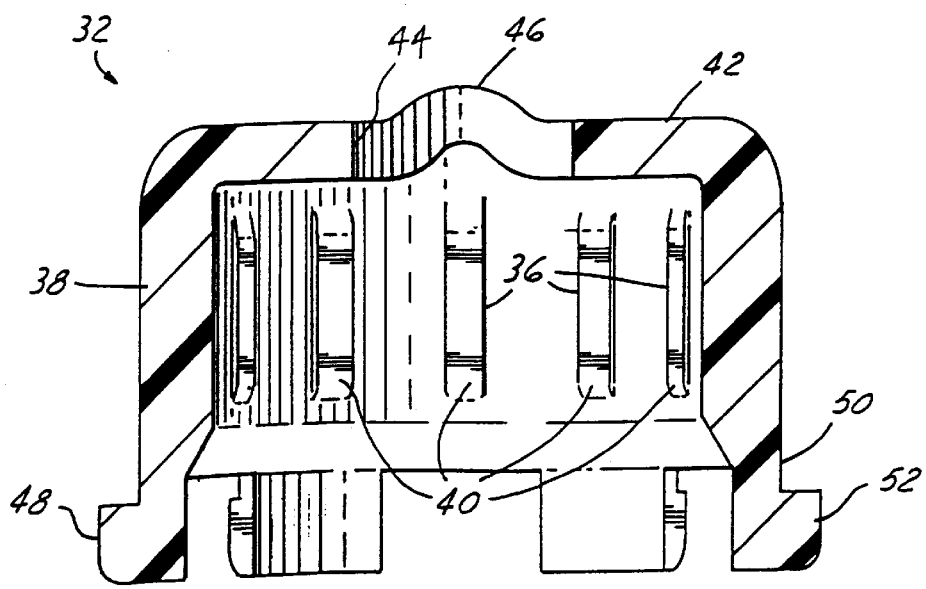
FIG. 4 is a view in section taken through line 4—4 of FIG. 3.

A striker cap 32, formed of hard molded plastic is press fit over the top end 28 of strut cylinder 30. Cap 32 acts primarily as a protective cover for strut seal 34 which maintains damping fluid under pressure within cylinder 30. As seen in FIGS. 3 and 4, a circular array of axially-extending ridges 36 is formed on the inner surface of the cylindrical tubular side wall 38 of the cap 32. Ridges 36 include a ramped wedge-like lower end portion 40 for initiating and facilitating the tight press-fit of cap 32 on cylinder 30.

Cap 32 further includes a roof 42 having a central aperture 44 formed therethrough so as to define a generally annular abutment and engagement surface supported by the side wall 38. A projection or bumper 46 extends axially outwardly and upwardly from roof 42 for making initial contact with the jounce bumper 26.

Bumper 46 is formed as a pair of arched ridges extending diametrically across roof 42 on opposite sides of aperture 44. The cross-sectional area of the projecting ridges decreases from the roof 42 toward the jounce bumper 26 to provide a gradual increase in contact area between the cap and jounce bumper.

A serrated or spoked support skirt 48 extends radially outwardly around the lower edge 50 of side wall 38. Skirt 48, as defined by an annular series of flanges 52, provides support surfaces for the lower axial end face 54 of dust shield or bellows 56. This support maintains the bellows 56 in a generally centered position around the striker cap 32 as well as around piston rod 58 and within coil spring 54, thereby preventing rubbing wear and noise between the bellows 56, cap 32, and coil spring 24.

Figure 2:
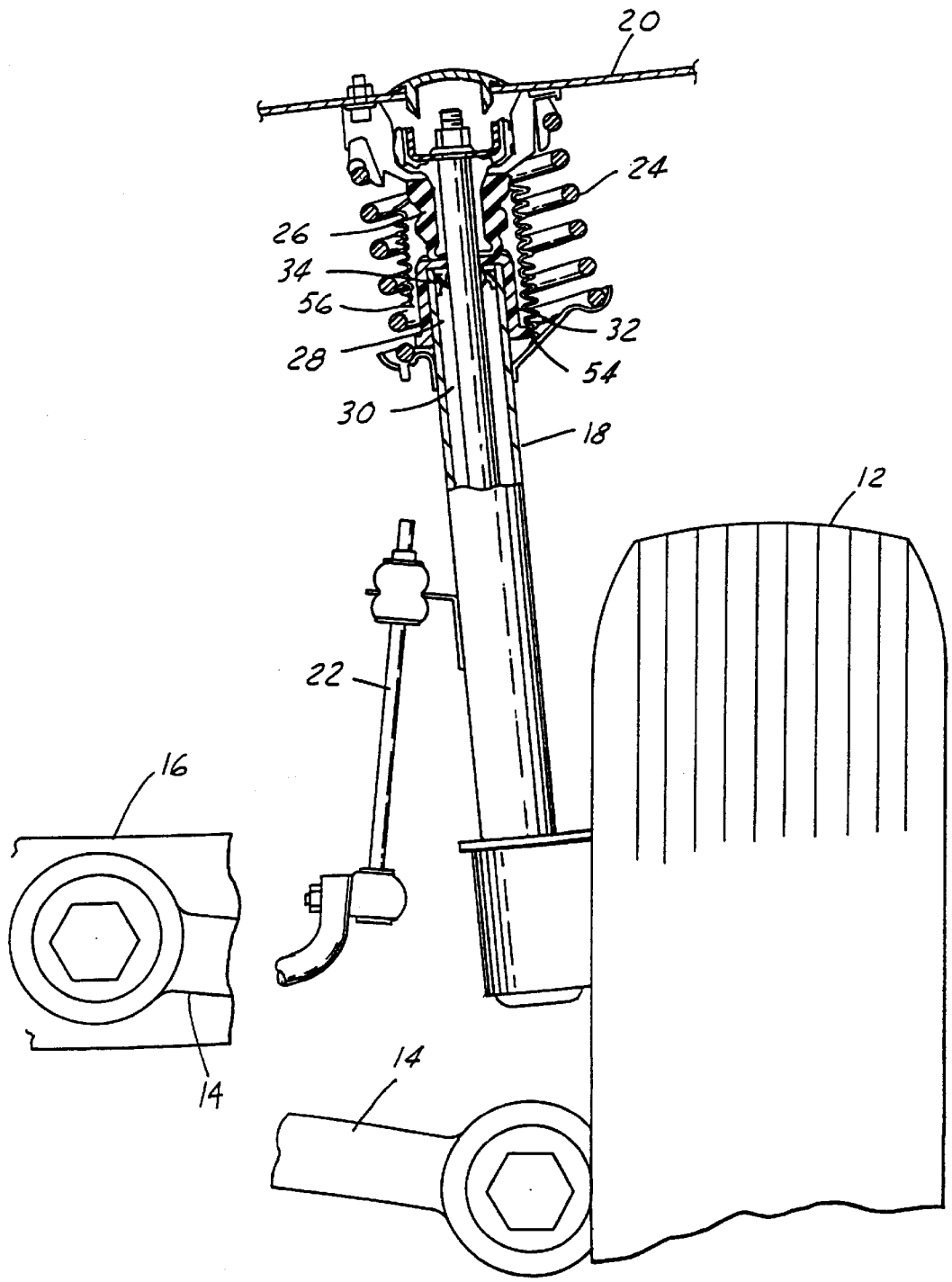
FIG. 2 is a view of FIG. 1 showing the suspension system in a severe jounce position with the striker cap abutted against the jounce bumper.

In use, as the suspension system 10 moves from its relatively unloaded position in FIG. 1 to its severely loaded position in FIG. 2, the striker cap 32 engages and axially compresses the jounce bumper 26. During this compression, the bumper 46 on cap 32 progressively embeds itself within the elastomeric material of the jounce bumper 26. As seen in FIG. 4, the arched shape of bumper 46 will gradually compress the material of the jounce bumper 26 while displacing more and more volume of the material of bumper 26 until the roof of cap 32 contacts the bumper 26.

Because of this gradual dissipation of energy between the jounce bumper 26 and the striker cap 32, loud contact noises are reduced due to the decreased impulse of contact forces therebetween. In tests, such contact noises have been reduced by 75% using a striker cap with an axially-extending bumper 46 as compared to using a flat-roofed striker cap which makes substantially full initial contact with a jounce bumper 26.

Many modifications and variations of the present invention are possible in light of the above teachings. Therefore, within the scope of the appended claims, the present invention may be practiced other than specifically described.

What is claimed is:

1. A striker cap for a vehicle suspension system, comprising:

a cup-shaped body having a substantially cylindrical side wall and a roof connected to said side wall, said roof having an aperture formed therethrough and at least one bumper extending outwardly from said roof for limiting initial contact area between said suspension system and said roof wherein said bumper comprises a ridge located adjacent said aperture and wherein said ridge comprises a pair of arches located on opposite sides of said aperture.

2. The striker cap of claim 1, further comprising a support extending radially from said side wall for supporting a dust shield.

3. A striker cap for engaging a jounce bumper in a vehicle suspension system comprising:

an annular engagement surface formed on said cap and comprising an axial projection extending from said cap toward said jounce bumper, said projection having a cross-section decreasing in area from said cap toward said jounce bumper and wherein said engagement surface comprises an arched surface portion.

4. The striker cap of claim 3, wherein said arched surface portion comprises a pair of arches and wherein said engagement surface has an aperture formed therethrough between said pair of arches.

5. The striker cap of claim 3, further comprising cylindrical side wall supporting said annular engagement surface.

6. The striker cap of claim 5, further comprising a radial support extending outwardly from said side wall for supporting a dust shield.

7. A striker cap assembly for a vehicle suspension system, comprising:

a strut cylinder mounted in said suspension system and having an end portion;

a jounce bumper mounted in said suspension system, and fitted on and around said end portion of said strut cylinder; and a striker cap comprising a cup-shaped body having a substantially cylindrical side wall and a roof connected to said side wall, said roof having an aperture formed therethrough and at least one arched axial projection extending axially outwardly from said roof for limiting initial contact area between said jounce bumper and said roof.

* * * * *